April 21, 1931. A. A. HOLLAND 1,802,017

MOLD FOR ICE CREAM CONES

Filed June 12, 1930

Inventor.
Arthur A. Holland.

Patented Apr. 21, 1931

1,802,017

UNITED STATES PATENT OFFICE

ARTHUR A. HOLLAND, OF TORONTO, ONTARIO, CANADA

MOLD FOR ICE-CREAM CONES

Application filed June 12, 1930. Serial No. 460,644.

The principal objects of this invention are, to produce ice cream cones of a uniform quality and dimensions and with smooth, inner and outer surfaces which will enable their being readily separated after being packaged without marring their edges.

A further and important object is to enhance the crispy quality of the cone and to simplify the manufacture thereof.

The principal feature of the invention consists in the novel construction of the molds and cores for forming the cones, whereby the outer shape of the cone is positively formed and both steam and surplus batter are enabled ready escape, the surplus material being neatly sheared from the inside of the cone in the process of manufacture.

In the accompanying drawings, Figure 1 is a longitudinal elevational view showing a section of a mold constructed in accordance with this invention.

Figure 2:
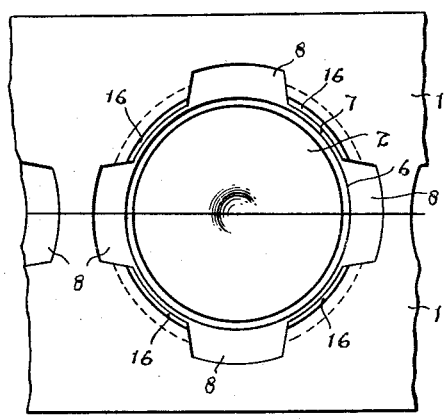
Figure 2 is a plan view of the top of the open mold.
Figure 1:
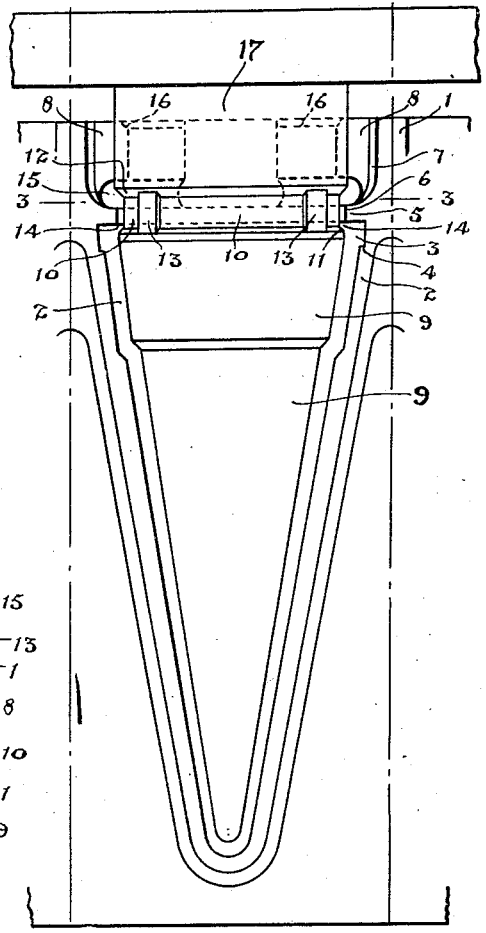
Figure 3:
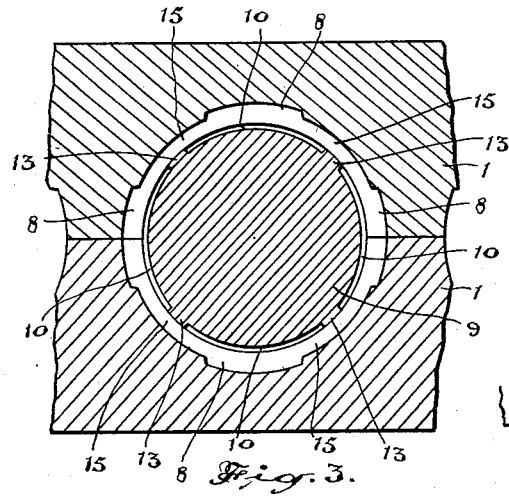
Figure 3 is a transverse sectional view through a mold, taken on the line 3—3 of Figure 1.
Figure 4:
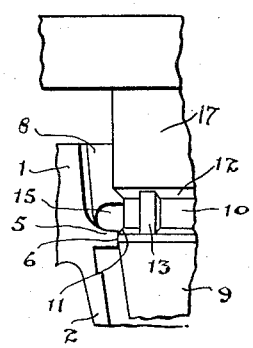
Figure 4 is a detail elevational view of a portion of the mold and core showing the core in its partly removed position having sheared the surplus material from the cone.

In the manufacture of ice cream cones it is the practice to use a dividend mold and to drop thereinto a small quantity of batter. A core is then inserted into the mold and being pressed down into the batter it causes the batter to flow upwardly to fill the mold.

In numerous devices the surplus batter is allowed to overflow and is trimmed off after the cone is cooked. Other devices close the top of the cone and press the material therein in the final movement of the core to ensure the completion of the shape of the cone. Others have forced the core into the mold, squeezing the batter out and allowing the surplus to escape and then finally cutting off the escape and pressing the top of the cone.

According to the present invention the core is inserted into the mold to cause the batter to rise and fill the mold and provision is made to permit the escape of surplus batter and allow the steam formed during the process of cooking free egress and the surplus material is automatically cleared from the cone on the removal of the core and before the discharge of the cone from the mold.

In the construction herein shown the mold 1 is formed with a thin converging middle wall 2 having its inner surface shaped to the desired contour for the finished shape of the cone, a slightly enlarged rim portion 3 terminating in an edge flange 4.

The mold is provided with a flange 5 extending inwardly over the recess 4 for forming the edge flange of a cone and the inner edge 6 is cylindrical.

The mold cavity 7 above the flange 5 is slightly larger in diameter than the inner edge 6 and is provided with recesses 8 of much greater diameter or depth. These recesses form pockets to receive the surplus material squeezed out of the body portion of the mold.

The core 9, the external diameter of which corresponds to the interior shape of the finished cone, is provided with an annularly grooved portion 10, the bottom edge of which bevels outwardly to an edge 11 which is of a slightly lesser diameter than the edge 6 of the flange 5 and forms a shearing element adapted to co-operate with the edge 6 in cutting off the cone material in a clean cut finished manner after the cone has been cooked.

The upper edge 12 of the groove 10 extends above the flange 5 and is bevelled upwardly.

Vertical bars 13 are spaced at uniform intervals around the groove 10 so that they will come between the recesses 8. These bars may be dispensed with if desired.

Circumferential grooved sections 15 connect the several recesses 8 above the flange 5 and the part cylindrical surfaces 16 between the recesses form guiding faces for the upper cylindrical portion 17 of the core, so that when the core is inserted into the mold the cylindrical portion 17 is centered by the portions 16 between the recesses 8 and the molding portion of the core, as well as the trimming edges of the core and mold are maintained in proper alignment.

In the operation of the mold the required amount of batter is deposited in the mold. The core is then moved downwardly into the mold and the point thereof enters the batter and causes it to flow upwardly. The heat of the mold and of the core coming in contact with the batter generates steam which flows out through the top of the mold.

The core in moving inwardly moves the edge 11 past the edge 6 of the flange 5 so that a narrow passage 14 remains which gives free access to the excess batter in the mold after all its corners and pattern shapes have been completely filled under pressure.

The steam and batter flow upwardly through the passage 14 to the grooves 10 and into the recesses 8 provided in the upper part of the mold and steam generated in the process also escapes by the same path.

When the batter is cooked and the cone is ready to be discharged from the mold, the core is raised and in moving upwardly the edge 11 moving past the edge 6 of the flange 5 shears off the fin formed on the inner side of the cone.

The outer surfaces of the cones are absolutely uniform in diameter and shape and the shearing of the fin from the inner edge provides the cone with a clean cut uniform shape inside and out. The surplus material cut away by the shearing action and after remaining in the recesses 8 drops out from the mold when the molds are separated in releasing and discharging a cone.

What I claim as my invention is:—

1. A mold for ice cream cones open at the top, and a core adapted to enter the mold and having a recess to permit the escape of steam and excess batter, the lower edge of the recess being adapted on the outward movement of the core to trim the excess material from the cone.

2. A mold for ice cream cones open at the top and having an inwardly projecting flange, a core adapted to enter the mold and having an annular recess the edge of which is adapted to co-operate with the edge of said flange to trim the surplus material from the inside of the cone.

3. A mold for ice cream cones open at the top and having an inwardly projecting flange, a core adapted to enter the mold and having an edge adapted to co-operate with the edge of said flange to trim the surplus material from the inside of the cone, said core being recessed above said trimming edge to permit the escape of steam and excess batter from the mold.

4. A mold for ice cream cones open at the top and having an inwardly projecting flange, a core adapted to enter the mold and having an edge adapted to co-operate with the edge of said flange to trim the surplus material from the inside of the cone, said core having an annular recess above said trimming edge and said mold having a space above the flange adapted to receive the excess batter forced past the flange of the mold.

5. A mold for ice cream cones having a flange extending angularly inward around the molding chamber to form the top edge of the cone, a plurality of recesses arranged in the wall of the mold above said flange and opening inwardly, a core adapted to enter the mold having a cutting surface of slightly smaller diameter than the inner diameter of said flange and having an annular recess above said cutting surface, and means arranged in said recess in said core for directing the upwardly flowing batter into the recesses above the flange of the mold.

6. A mold for ice cream cones having a molding recess provided with an inwardly extending annular flange, said mold having recesses arranged above said flange to receive the excess batter, a core adapted to enter said mold having an edge telescopically co-operating with the flange of the mold to shear the excess batter from the cone on the outward movement of the core, and means for guiding the core centrally into the mold.

7. A mold for ice cream cones having a molding recess provided with an inwardly extending annular flange at the top, and a flange arranged above the molding recess extending inwardly, a core adapted to enter the mold and having a cylindrical portion adapted to be engaged by the upper flange of the mold to guide and hold the core centrally within the mold, and an annular shoulder on said core cooperating with the first-mentioned flange on the removal of said core to shear the excess batter from the cone.

8. A mold for ice cream cones having a molding cavity formed with an inwardly extending flange adjacent to the top and having recesses above said flange and spaced therefrom, the spaces above said recesses presenting the parts of a cylindrical wall, and a core having a cylindrical upper end adapted to engage the wall surfaces between said recesses in guiding contact and having a reduced circumferential recess of a lesser diameter than the inner diameter of the mold flange, said core having a portion below said reduced recess of a diameter only slightly smaller than the internal diameter of the flange but spaced below said flange when the core is in its innermost position providing a free recess opening around said flange from the inner part of the mold.

9. A mold for ice cream cones open at the top, a core adapted to enter said mold, and means forming an active co-operation between said core and mold within the latter on relative movement thereof for trimming the cone on its inner edge.

ARTHUR A. HOLLAND.